（12） United States Patent
Chen et al.

(10) Patent No.: US 7,758,774 B2
(45) Date of Patent: Jul. 20, 2010

(54) LUMINESCENT GLASS

(75) Inventors: Danping Chen, Ikeda (JP); Tomoko Akai, Ikeda (JP)

(73) Assignees: Japan Science and Technology Agency, Saitama (JP); National Institute of Advanced Industrial Science and Technology, Tokyo (JP)

( * ) Notice: Subject to any disclaimer, the term of this patent is extended or adjusted under 35 U.S.C. 154(b) by 1226 days.

(21) Appl. No.: 10/536,695

(22) PCT Filed: Nov. 28, 2003

(86) PCT No.: PCT/JP03/15208

§ 371 (c)(1),
(2), (4) Date: May 27, 2005

(87) PCT Pub. No.: WO2004/050576

PCT Pub. Date: Jun. 17, 2004

(65) Prior Publication Data

US 2006/0037366 A1    Feb. 23, 2006

(30) Foreign Application Priority Data

Nov. 29, 2002  (JP) .............................. 2002-349153
May 6, 2003    (JP) .............................. 2003-128325
May 6, 2003    (JP) .............................. 2003-128333

(51) Int. Cl.
  *C09K 11/08*   (2006.01)
  *C09K 11/66*   (2006.01)
  *C09K 11/77*   (2006.01)
  *C03C 3/06*    (2006.01)

(52) U.S. Cl. .................. 252/301.4 F; 252/301.6 F; 252/301.4 R; 501/54

(58) Field of Classification Search .............. 501/54; 252/301.4 F, 301.6 F, 301.4 R
See application file for complete search history.

(56) References Cited

U.S. PATENT DOCUMENTS

| | | | |
|---|---|---|---|
| 4,110,096 A * | 8/1978 | Macedo et al. | 65/30.14 |
| 4,183,620 A * | 1/1980 | Macedo et al. | 385/141 |
| 5,585,640 A | 12/1996 | Huston et al. | |
| 5,627,113 A * | 5/1997 | Debnath | 501/54 |
| 5,651,804 A * | 7/1997 | Debnath | 65/30.13 |
| 6,211,526 B1 | 4/2001 | Huston et al. | |

FOREIGN PATENT DOCUMENTS

| | | |
|---|---|---|
| JP | S49-134187 A | 12/1974 |
| JP | 64-076933 A | 3/1989 |
| JP | 3050130 A | 3/1991 |
| JP | 06-029001 A | 2/1994 |
| JP | 07-330369 A | 12/1995 |
| JP | 08-133780 A | 5/1996 |
| JP | 09-202642 A | 8/1997 |
| JP | 10-167755 A | 6/1998 |
| JP | 2000-326786 A | 11/2000 |
| JP | 2001-270733 A | 10/2001 |
| WO | WO 9621868 A | 7/1996 |

OTHER PUBLICATIONS

Xie Kang et al., "Study of preparation and spectral properties of the co/Ce co-doped high silica glasses," Journal of the Chinese Ceramic Society, vol. 29, No. 5, pp. 496-499, 2001.
Journal of Yuzhou University, vol. 14, No. 4, pp. 8-15, 1997.
M. Nogami et al., "Enhanced emission from $EU^{2+}$ ions in col-gel derived $Al_2O_3$-$SiO_2$ glasses," Appl. Phys. Lett., 69(25) 3776 (1996), American Institute of Physic.
M. Nogami, "Fluorescence properties of Eu-doped $GeO_2$-$SiO_2$ glass heated under an $H_2$ ratmosphere," J. Luminescence, 92, 329 (2001), Elsevier Science.
A.L. Huston et al., "Fiber-optic-coupled, laser heated thermoluminescence dosimeter for remote radiation sensing," Appl. Phys. Lett., 68(24), 3377 (1996), American Institute of Physics.
B.L. Justus et al., "Ultraviolet dosimetry using thermoluminescence of semiconductor-doped Vycor glass," Appl. Phys. Lett., 67(9), 1179 (1995), American Institute of Physics.

(Continued)

*Primary Examiner*—Karl E Group
*Assistant Examiner*—Elizabeth A Bolden
(74) *Attorney, Agent, or Firm*—Fitch, Even, Tabin, & Flannery

(57) ABSTRACT

The present invention provides a process for producing a luminescent glass, comprising the steps of adsorbing, to a porous high silica glass, at least one metal component selected from the group consisting of elements of Groups IIIA, IVA, VA, VIA, VIIA, VIII, IB, IIB and IVB of the Periodic Table; and thereafter heating the porous glass in a reducing atmosphere.

The luminescent glass obtained by the process is excellent in heat resistance, chemical durability, mechanical strength and other properties, and exhibits strong luminescence when irradiated with UV light or the like. The glass can be effectively used as a luminous body for lighting systems, display devices, etc.

8 Claims, 9 Drawing Sheets

OTHER PUBLICATIONS

B.L. Justus et al., "Laser-heated radiation dosimetry using transparent thermoluminescent glass," Appl. Phys. Lett., 68(1), 1 (1996), American Institute of Physics.

Tomoko Akai et al., "Waste glass recycling for high-added-value application," Presentation Materials of the 10th Technology Seeds Announcement Meeting of Kinki Industry-Academic-Governmental Collaboration, Mar. 28, 2003, English translation.

Danping Chen et al., "Preparation and fluorescent properties of rare earth-containing high silica glass," Preprints of Annual Meeting of the Ceramic Society of Japan 2003, p. 64, Mar. 23, 2003, English translation.

Sumio Sakuhana et al., "Glass handbook," Kabushiki Kaisha Asakura Shoten, Sep. 30, 1975 (30. 09. 75), pp. 98 to 99.

Howell et al., "Fluorescence of Commercial Porous High Silica Glasses," Database Inspec, vol. 54, No. 5, 1975, pp. 503-509.

Kang et al., "Study of preparation and spectral properties of the Co/Ce co-doped high silica glasses," Database Inspec., Oct. 2001, 2 pp.

* cited by examiner (a)

(b)

(a)

(b)

(a)

(b)

LUMINESCENT GLASS

This application is the National Phase of International Application No. PCT/JP2003/015208 filed Nov. 28, 2003, and claims the priority from Japanese Patent Application No. 2002-349153 filed on Nov. 29, 2002, Japanese Patent Application No. 2003-128325 filed on May 6, 2003, and Japanese Patent Application No. 2003-128333 filed on May 6, 2003, the complete disclosure of each of the foregoing applications is incorporated herein by reference.

TECHNICAL FIELD

The present invention relates to a luminescent glass, a process for producing the same, and use of the same.

BACKGROUND ART

Fluorescent materials containing a rare earth element, such as Eu (europium) or Tb (terbium), as a fluorescer, are known. Such fluorescent materials are produced by applying a powdery fluorescent substance containing a rare earth element to a support; forming a coating film containing a fluorescent substance on a support by sol-gel method; or like process (Japanese Unexamined Patent Publication No. 2001-270733; M. Nogami and Y. Abe, "Enhanced emission from $Eu^{2+}$ ions in sol-gel derived $Al_2O_3$—$SiO_2$ glasses", Appl. Phys. Lett., 69(25) 3776 (1996), American Institute of Physic; M. Nogami, "Fluorescence properties of Eu-doped $GeO_2$—$SiO_2$ glass heated under an $H_2$ atmosphere", J. Luminescence, 92,329 (2001), Elsevier Science; etc.).

Fluorescent materials obtained by applying a powdery fluorescent substance are already being practically used, for lamps, cathode-ray tubes, etc. However, in most of such materials, the fluorescent substance is applied to the surface of the support, and thus such materials are opaque and generate merely superficial fluorescence.

Generally, fluorescent materials for high intensity lamps, displays, adjustment of short wavelength lasers or other purposes are required to be transparent and capable of being bulk-molded. Materials containing a stable oxide glass as a matrix may be conceived of as such fluorescent materials. In oxide glasses, however, the rare earth element or the like as a luminescence center generally binds strongly to the oxide glass matrix, and thus nonradiative transitions are likely to occur, making it difficult to obtain strong luminescence.

Glasses containing 2 to 15 mol % of Tb or Eu, calculated on an oxide basis, are known as oxide glasses with a relatively strong luminescence (Japanese Unexamined Patent Publication No. 1998-167755). Such glasses are excellent in heat resistance, chemical durability, mechanical strength, etc., but have a drawback in that they extremely expensive because of the high content of rare earth elements.

Fluorescent glasses prepared using a fluoride glass or oxyfluoride glass are also known (Japanese Unexamined Patent Publications No. 1996-133780, No. 1997-202642, etc.). However, such fluorescent glasses are poor with respect to heat resistance, chemical durability, etc., and have insufficient mechanical strength. It is therefore difficult to form such fluorescent glasses into large glass plates and to use them in the air, and especially outdoors, for long periods. These glasses have many other problems, such as the harmful effects of fluoride on the environment.

Other known production processes for luminescent glasses include doping of porous oxide glasses with ions or semiconductor fine particles (U.S. Pat. No. 6,211,526; A. L. Huston, B. L. Justus and T. L. Johnson, "Fiber-optic-coupled, laser heated thermoluminescence dosimeter for remote radiation sensing", Appl. Phys. Lett., 68 (24), 3377 (1996), American Institute of Physics; B. L. Justus and A. L. Huston, "Ultraviolet dosimetry using thermoluminescence of semiconductor-doped Vycor glass", Appl. Phys. Lett., 67 (9), 1179 (1995), American Institute of Physics; B. L. Justus, A. L. Huston and T. L. Johnson, "Laser-heated radiation dosimetry using transparent thermoluminescent glass", Appl. Phys. Lett., 68 (1), 1 (1996) American Institute of Physics, etc.). However, the luminescent glasses obtained by these processes are incapable of generating fluorescence with a sufficiently high luminescence intensity.

DISCLOSURE OF THE INVENTION

The present invention was accomplished in view of the state of the prior art mentioned above. The main object of the present invention is to provide a luminescent glass that is excellent in heat resistance, chemical durability, mechanical strength and other properties, and that generates strong fluorescence when irradiated with UV (ultraviolet) light or the like.

The present inventors conducted extensive research to achieve the above object and found that a luminescent glass that can achieve the above object can be obtained by a process comprising adsorbing a specific luminescent component to a porous high silica glass used as a matrix, followed by heating in a reducing atmosphere.

The present invention provides the following processes for producing a luminescent glass.

1. A process for producing a luminescent glass, comprising the steps of adsorbing, to a porous high silica glass, at least one metal component selected from the group consisting of elements of Groups IIIA, IVA, VA, VIA, VIIA, VIII, IB, IIB and IVB of the Periodic Table; and thereafter heating the porous glass in a reducing atmosphere.

2. A process according to Item 1, wherein the metal component to be adsorbed to the porous high silica glass is at least one member selected from the group consisting of elements of the fourth period of the Periodic Table, elements of the fifth period of the Periodic Table, and lanthanoids.

3. A process according to Item 2, wherein the metal component to be adsorbed to the porous high silica glass is at least one member selected from the group consisting of V, Cr, Mn, Fe, Co, Ni, Cu, Ag, Sn, Eu, Ce and Tb.

4. A process according to Item 1, wherein the metal component to be adsorbed to the porous high silica glass is a rare earth element or elements.

5. A process according to Item 1, wherein the metal component to be adsorbed to the porous high silica glass is at least one metal component selected from the group consisting of elements of Groups IVA, VA, VIA, VIIA, VIII, IB, IIB and IVB of the Periodic Table.

6. A process according to Item 1, wherein the heating temperature is 900 to 1600° C.

7. A process according to Item 1, further comprising, before the heating step, the step of adsorbing, to the porous glass, at least one element selected from the group consisting of B, N, F, Al, P and S.

8. A process according to Item 1, wherein the porous high silica glass is one obtained by causing phase separation of an alkali borosilicate glass by heat treatment and then treating the phase-separated glass with an acid.

9. A luminescent glass prepared by a process according to any one of Items 1 to 8.

10. A luminescent glass according to Item 9, comprising at least 96 wt. % of $SiO_2$, 0.5 to 3 wt. % of $B_2O_3$, 0.1 to 1.5 wt.

% of $Al_2O_3$, and 50 to 2000 ppm of at least one metal component selected from the group consisting of elements of Groups IIIA, IVA, VA, VIA, VIIA, VIII, IB, IIB and IVB of the Periodic Table.

11. A lighting system for use in water or air, comprising the luminescent glass according to Item 9 and an ultraviolet light source.

12. A lighting system comprising a luminescent glass according to Item 9 disposed in water; an ultraviolet light source disposed outside water; and an optical fiber provided so that one end of the optical fiber is connected to the ultraviolet light source and the other end is located in the vicinity of the luminescent glass.

13. A display device comprising as a luminous body a luminescent glass according to Item 9.

In the luminescent glass of the present invention, a specific metal component is dispersed without agglomeration in a high silica glass matrix. Such a luminescent glass is excellent in heat resistance, chemical durability, mechanical strength and other properties, and exhibits strong fluorescence when irradiated with UV light.

The luminescent glass of the present invention can be obtained by adsorbing a metal component to a porous high silica glass and then heating the glass in a reducing atmosphere. This process is described below in detail.

Process for Producing Luminescent Glass (1) Starting Material (Porous High Silica Glass):

The porous high silica glass for use as a starting material is preferably a glass that contains $SiO_2$ as a main component and has a relatively small pore size. Desirable examples include oxide glasses that contains at least about 96 wt. %, and preferably at least about 98 wt. %, of $SiO_2$ and that have a mean pore size of about 2 nm to about 8 nm, and preferably about 3 nm to about 6 nm. When the pore size of the porous glass is too large, the adsorbed luminescent component is likely to agglomerate at the time of heating, whereas when the pore size is too small, a long time is required to adsorb the luminescent component. Thus, excessively large or small pore sizes are not preferable.

The porosity of the porous glass is preferably about 25% to about 45%. Too low a porosity makes it impossible to adsorb a sufficient amount of the luminescent component, leading to low luminescence intensity, and thus is not preferable. Too high a porosity is also not preferable since it renders the glass liable to cracking.

In this description, the mean pore size is measured by the nitrogen adsorption method, and the porosity is the proportion of void space calculated from the silica density based on the measured weight and volume of the porous glass.

When subjecting such a porous high silica glass to a heating step as mentioned hereinafter, the pores of the glass are eliminated, and the entire glass shrinks and becomes transparent.

The porous high silica glass can be obtained by, for example, separating an alkali borosilicate glass by heat treatment into an insoluble phase (silica phase) containing $SiO_2$ as the main component, and a soluble phase (boric oxide phase) containing $B_2O_3$ as the main component, followed by acid treatment to leach out alkali components, boric oxide components and the like.

Any known alkali borosilicate glass can be used as the alkali borosilicate glass. Such alkali borosilicate glasses usually contain Si, B, O, Na, Al, Ca and/or like elements. Specifically, a glass can be used which contains, based on the total weight of the glass, about 45 to about 60 wt. % of $SiO_2$, about 24 to about 40 wt. % of $B_2O_3$, about 5 to about 10 wt. % of alkali metal oxide(s), about 1 to about 4 wt. % of $Al_2O_3$, and about 2 to about 6 wt. % of CaO.

The alkali borosilicate glass can be prepared from raw materials used for the preparation of ordinary alkali borosilicate glasses, by mixing the raw materials to obtain a desired composition, heating and melting the mixture, and cooling the melt. The raw materials can be melted, for example, in an oxygen-containing atmosphere, such as the air, at a temperature of about 1350 to about 1450° C., and then cooled. Also usable is a glass obtained using soda lime glass or like waste glass as a raw material, the glass being prepared by adding boric acid and/or other components to the waste glass, and melting the mixture to obtain a glass having the same composition as that of the above alkali borosilicate glass.

To obtain a porous high silica glass using the above alkali borosilicate glass, the alkali borosilicate glass first needs to be heat-treated. The heat treatment separates the glass into an insoluble phase (silica phase) containing $SiO_2$ as the main component, and a soluble phase (boric oxide phase) containing $B_2O_3$ as the main component.

The conditions for heat treatment can be suitably selected so that the phase separation proceeds sufficiently. Usually, the glass is heated in an oxygen-containing atmosphere, such as in the air, at about 550 to about 650° C. for about 20 to about 80 hours.

Subsequently, the phase-separated alkali borosilicate glass is treated with an acid. The acid treatment leaches out the soluble phase (boric oxide phase) containing $B_2O_3$ as its main component, thereby forming a porous glass.

The acid treatment is performed under conditions such that the soluble phase is sufficiently leached out, for example, conditions similar to those described in U.S. Pat. No. 2,106,744. For example, the phase-separated alkali borosilicate glass can be immersed in an aqueous acid solution containing nitric acid, hydrochloric acid, sulfuric acid or like inorganic acid at a concentration of about 0.5 to about 2 N, at about 80 to about 100° C., for about 16 to about 40 hours. Too short a treatment period makes it impossible to sufficiently leach out the boric oxide phase, whereas too long a treatment period is likely to cause cracking or like damage to the glass. Thus, such treatment periods are not preferable.

Acid treatment may be carried out two or more times.

In the above manner, the porous high silica glass for use in the present invention can be obtained.

(2) Adsorption Step

In the present invention, a metal component is first adsorbed to the above-mentioned porous high silica glass. The metal component may be adsorbed in the form of metal atom or metal ion. Alternatively, the metal atom and metal ion can be adsorbed at the same time.

At least one metal component (hereinafter sometimes referred to as "luminescent component") selected from the group consisting of elements of Groups IIIA, IVA, VA, VIA, VIIA, VIII, IB, IIB and IVB of the Periodic Table is used as the component to be adsorbed. These metal components may be used singly or in combination.

Examples of elements of Group IIIA of the Periodic Table include Sc (scandium), Y (yttrium), lanthanoids [La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), Lu (lutetium)], etc. Examples of elements of Group IVA of the Periodic Table include Ti (titanium), Zr (zirconium), Hf (hafnium), etc. Examples of elements of Group VA of the Periodic Table include V (vanadium), Nb (niobium), Ta (tantalum), etc.

Examples of elements of Group VIA of the Periodic Table include Cr (chromium), Mo (molybdenum), W (tungsten), etc. Examples of elements of Group VIIA of the Periodic Table include Mn (manganese), Tc (technetium), Re (rhenium), etc. Examples of elements of Group VIII of the Periodic Table include Fe (iron), Co (cobalt), Ni (nickel), Ru (ruthenium), Rh (rhodium), Pd (palladium), Os (osmium), Ir (iridium), Pt (platinum), etc. Examples of elements of Group IB of the Periodic Table include Cu (copper), Ag (silver), Au (gold), etc. Examples of elements of Group IIB of the Periodic Table include Zn (zinc), Cd (cadmium), Hg (mercury), etc. Examples of elements of Group IVB of the Periodic Table include Si (silicon), Ge (germanium), Sn (tin), Pb (lead), etc. Such elements can be used singly or in combination, and may be adsorbed as metal atom or ion.

Among these, elements of the fourth period of the Periodic Table, elements of the fifth period of the Periodic Table, and lanthanoids, etc. are especially preferable. A glass with an especially high luminescence intensity can be obtained by adsorbing these elements as metal atom or ion.

Examples of elements of the fourth and fifth periods of the Periodic Table include V, Cr, Mn, Fe, Co, Ni, Cu, Ag, Sn, etc. Preferable lanthanoids include Eu, Ce, Tb, etc. Particularly preferable are Eu, Ce, etc., which exhibit strong luminescence.

The luminescent component can be adsorbed to the porous glass by, for example, immersion of the porous glass in a solution containing the luminescent component; application of a solution containing the luminescent component to the porous glass; introduction of the luminescent component into the porous glass by a vapor phase process, such as CVD or sputtering; and other methods. These methods can allow the luminescent component to be sufficiently adsorbed on the surface and in the pores of the porous glass. In particular, the luminescent component can easily permeate into the porous glass by immersing the porous glass in a solution containing the luminescent component, thereby forming a glass that exhibits strong luminescence.

Examples of usable solutions containing the luminescent component include solutions of compounds containing at least one metal component selected from the group consisting of elements of Group IIIA, IVA, VA, VIA, VIIA, VIII, IB, IIB and IVB of the Periodic Table. Specific examples of such solutions include solutions of nitrates, oxides, chlorides, carbonates, sulfates, organic metal salts or other compounds containing the elements mentioned above, solutions of hydrates of such compounds, and the like. The solvent used in such solutions are not limited and may be suitably selected from water, organic solvents, etc.

The concentration of the compound containing the luminescent component is not limited as long as the metal component used is fully dissolved, and for example, an aqueous solution with a concentration of about 0.1 to about 10 wt. % can be used. Too high a concentration of the metal component is likely to cause deposition of the metal component on the surface or clouding, at the time of heating. In contrast, too low a concentration results in an insufficient adsorption amount, failing to obtain satisfactory luminescence performance.

The conditions for immersing the porous glass in the solution are not limited, and usually the porous glass can be immersed in the solution at room temperature. The amount of the porous glass to be added to the solution is not limited, and may be suitably determined according to the amount of the metal component to be adsorbed. For example, about 1 to about 100 g of the porous glass may be added to 1 L of a solution with a concentration within the above range, and allowed to stand for about 30 minutes to about 3 hours.

After adsorption of the metal component to the porous glass, the glass may be dried and then subjected to metal component adsorption again. The metal component adsorption procedure and drying procedure may be carried out two or more times. This ensures reliable adsorption of the luminescent component to the porous glass, prevents concentration quenching, and gives a fluorescent material for vacuum UV light, with a higher luminescence intensity.

According to the present invention, the luminescent glass emits strong luminescence even when it does not have a high luminescent component content, and therefore can be obtained at low cost.

When the luminescent component is other than a rare earth element, i.e., when using at least one metal component selected from the group consisting of elements of Groups IVA, VA, VIA, VIIA, VIII, IB, IIB and IVB as the luminescent component, the luminescent glass can be obtained at particularly low cost.

The use of a rare earth element as the luminescent component is advantageous in that it achieves a high luminescence intensity and makes it easy to obtain luminescence by irradiation with long wavelength UV light (364 nm).

In the present invention, at least one element selected from the group consisting of B, N, F, Al, P and S (hereinafter sometimes referred to as a "sensitizer component") may be adsorbed to the porous glass, as required. These elements function as a sensitizer and can be present around the metal component, thereby changing the environment of the metal component and increasing the luminescence intensity.

It is presumed that, when the sensitizer component is present with the luminescent component, the sensitizer component is converted into an oxide by heating at high temperatures, and exhibits an effect of increasing the intensity of fluorescence from metal atoms. Therefore, the luminescent glass obtained by heating the porous glass that has a luminescent component and a sensitizer component adsorbed thereto exhibits stronger luminescence when excited with UV light.

The method for adsorbing at least one element selected from the group consisting of B, N, F, Al, P and S to the porous glass is not limited, and may be, for example, immersion of the porous glass in a solution containing the sensitizer component, application of a solution containing the sensitizer component to the porous glass, or the like.

The solution containing the sensitizer component may be, for example, an aqueous solution of a soluble compound containing the sensitizer component. The concentration of such a compound is not limited, and may be, for example, about 20 to about 45 wt. %, and preferably about 30 to about 40 wt. %.

The use of an aqueous solution with a concentration within the above ranges allows the sensitizer component to deposit around the luminescent component and to effectively function, thereby increasing the luminescence intensity. An excessively high concentration of the sensitizer component is likely to cause devitrification of the glass, and thus is not preferable. It is preferable to add an acid to the aqueous solution. The use of an aqueous solution containing an acid makes it easy for the sensitizer component to deposit on the glass surface. Usable acids include nitric acid, hydrochloric acid, sulfuric acid, etc., among which nitric acid is especially preferable. The concentration of acid is not limited, and may usually be about 0.1 to about 3 N. When the acid concentration is excessively high, the sensitizer component is likely to deposit as an oxide, whereas when the acid concentration is excessively low, the adsorbability of the sensitizer component lowers. Thus, such concentrations are not preferable.

The conditions for treatment with solutions containing sensitizer components are not limited, and may be, for example, similar to those for adsorption of metal components.

Treatment for adsorbing the sensitizer component to the porous glass may be carried out two or more times. This allows the sensitizer component to easily permeate into the porous glass, thereby making it possible to obtain a fluorescent material that exhibits stronger luminescence.

The step of adsorbing the sensitizer component to the porous glass can be carried out at any stage before the heating step described hereinafter. The conditions, such as the number of times of carrying out the step, can be suitably determined. Thus, the sensitizer component may be adsorbed at any stage before or after the step of adsorbing the luminescent component to the porous glass, or at the same time as the step of adsorbing the luminescent component to the porous glass. Further, a drying step may be performed between the step of adsorbing the luminescent component to the porous glass, and the step of adsorbing the sensitizer component to the porous glass. A cycle including the two adsorption steps and a drying step may be performed two or more times.

(3) Heating Step

After adsorbing the luminescent component to the porous glass in the above manner, the porous glass is heated. This eliminates the pores of the porous glass, and causes the entire glass to shrink and become transparent.

The heating temperature is preferably about 900 to about 1600° C. Heating at a temperature within such a range makes it possible to suitably control the pore size, surface conditions and other conditions of the porous glass with the luminescent component adsorbed thereto, and to produce a luminescent glass that is excellent in UV light transmittance, heat resistance, chemical durability, mechanical strength and other properties and that exhibits strong fluorescence.

Heating at a temperature lower than 900° C. results in a luminescent glass with insufficient luminescence, whereas heating at a temperature higher than 1600° C. may soften the matrix glass during heating. Thus, such temperatures are not preferable.

It is essential that the heating be performed in a reducing atmosphere. By heating in a reducing atmosphere, a luminescent glass can be obtained which has higher luminescence intensity than that obtained by heating in an oxidizing atmosphere, such as in the air. The reason for this has not been clarified, but it is presumed that when the heating is carried out in a reducing atmosphere, the conditions of the interface between the luminescent component and the glass are different from those of a luminescent glass obtained by heating in an oxidizing atmosphere. The method of heating in a reducing atmosphere is not limited, and may be, for example, heating in an atmosphere of a reducing gas, such as hydrogen gas, or heating in an alumina crucible containing carbon.

The heating time is not limited, and may be in the range of about 30 minutes to about 3 hours, according to the desired degree of heating. Too short a heating time is not preferable since the pores are not sufficiently eliminated.

The method of cooling the oxide glass obtained by heating is not limited, and the oxide glass may be cooled, for example, by maintaining it at a constant temperature in a thermostatic chamber, or by allowing it to stand in the air. Although the heated glass may be allowed to cool by the above methods, a luminescent glass exhibiting stronger fluorescence can be obtained by rapidly cooling the heated glass to prevent reactions between the glass matrix and metal component. The cooling rate can be suitably determined, and may be about 5° C./sec or faster, and preferably about 100° C./sec or faster.

The above process uses an alkali borosilicate glass, which is relatively inexpensive, as a raw material, and thus is capable of producing a luminescent glass at low cost.

Moreover, the process is capable of producing a luminescent glass in a relatively simple manner and in large amounts.

Luminescent Glass

The glass obtained by the above process is a glass containing at least about 96 wt. % of $SiO_2$, about 0.5 to about 3 wt. % of $B_2O_3$, about 0.1 to about 1.5 wt. % of $Al_2O_3$, and about 50 to about 2000 ppm of at least one metal component selected from the group consisting of elements of Groups IIIA, IVA, VA, VIA, VIIA, VIII, IB, IIB and IVB of the Periodic Table. This glass further contains usually about 5 to about 100 ppm of Fe originated from the raw materials.

The above glass comprises, as a matrix, a high silica glass obtained by heating a porous high silica glass, and has a structure such that at least one metal component selected from the group consisting of elements of Groups IIIA, IVA, VA, VIA, VIIA, VIII, IB, IIB and IVB of the Periodic Table is dispersed in the interface portion of the silica phases formed by sintering of the pore portions of the porous glass. With such a structure, the glass exhibits extremely strong luminescence when excited with ultraviolet light, since the metal component is uniformly dispersed without agglomeration. Therefore, the luminescent glass of the present invention can convert UV rays, X rays and the like to light in the visible region, with high efficiency.

Further, since the glass matrix is a stable oxide glass, the luminescent glass of the present invention is excellent in heat resistance, chemical durability, mechanical strength and other properties, and thus is advantageous in that it is unlikely to develop defects caused by UV irradiation.

Since the luminescent glass has a high content of silica, the glass has such characteristics as high UV transmittance of the glass matrix, ability to be excited by short wavelength light, and is unlikely to develop defects caused by UV irradiation.

Further, the luminescent glass of the present invention exhibits strong fluorescence even when it does not have a high content of the luminescent component. Therefore, the present invention enables low-cost production of a luminescent glass with strong luminescence.

Furthermore, the luminescent glass of the present invention exhibits strong luminescence even when being heated with a burner, as demonstrated in the Examples given below. The luminescent glass also emits strong luminescence in heated water. Thus, the luminescent glass of the present invention exhibits strong luminescence not only at room temperature, but also in air or water at high temperatures. As described above, the glass of the present invention has both excellent heat resistance and excellent luminescent properties, and can be used effectively in various applications.

Moreover, the luminescent glass of the present invention can be formed into various shapes by suitably changing the production conditions. For example, a porous glass with a desired shape can be obtained by, in the production process of the porous glass, melting the raw material mixture at a high temperature, molding the melt by pouring it into a die of any of various shapes and cooling the melt. Using porous glasses with various shapes thus obtained, luminescent glasses with various shapes, such as tubes, plates, fibers, etc., can be produced.

Since the luminescent glass of the present invention has excellent functions as mentioned above, the glass can be used, for example, for adjusting the optical axis of an excimer laser and the like. The glass is also usable in fluorescent tubes for lamps, fluorescent fibers, displays, backlights for LCDs, display devices, etc.

Use of the Luminescent Glass

The luminescent glass of the present invention is applicable as, for example, a luminous body for a lighting system (lighting equipment), using the excellent characteristics mentioned above. The lighting system in which the luminescent glass of the present invention is applied comprises the luminescent glass and an ultraviolet light source, and its structure is not otherwise limited, and may be similar to any of various known lighting system structures.

Usable UV light sources include those capable of irradiating the luminous glass with electromagnetic waves in the wavelength region called the X-ray wavelength region or UV wavelength region (about 0.1 nm to about 400 nm). Specifically, commercially available black lights, UV lamps and the like can be used.

The intensity, wattage (W) and other factors of the UV light are not limited and can be determined according to the desired degree of luminescence.

The luminescent glass of the present invention exhibits luminescence even in water, when irradiated with UV light. Thus, a lighting system usable in water can be produced by using the luminescent glass as a luminous body. For example, the lighting system can be configured so that the luminescent glass is placed in water and irradiated with UV light from a light source placed outside water, or so that the luminescent glass is placed in water and an optical fiber is provided so that one end of the fiber is disposed in the vicinity of the luminescent glass and the other end is connected to a UV light source. With such a configuration, the lighting system can be used as an underwater lightening system. The distance between the luminescent glass and the end of the optical fiber is not limited, and may usually be about 30 cm or less. In a lighting system with this configuration, UV light is transmitted through the optical fiber and irradiates the luminescent glass from the vicinity of the glass, even though the UV light source is placed outside water. In this system, unlike an electric line, the optical fiber is not supplied with electricity and there is no risk of short circuiting. Further, since the lighting system is constituted by a minimum of necessary components including the luminescent glass, optical fiber, ultraviolet light source, etc., the appearance of the system is not impaired.

A space that gives a comfortable impression to people can be produced using the lighting system comprising the luminescent glass of the present invention, for example, by providing the luminescent glass on a transparent plate and irradiating the glass with a black light at night to generate luminescence. The luminescent glass can also be used for markers for traffic signs.

The luminescent glass of the present invention is an excellent material that emits strong luminescence even in a heated state as described later in Examples, and thus has both heat resistance and luminescent properties. Therefore, using the luminescent glass, a heat-resistant lighting system can be produced which exhibits strong luminescence even in a high temperature environment, regardless of the conditions, such as in water or in air.

Further, a display device can be produced using the luminescent glass. The structure of the display device is not limited as long as the device comprises the luminescent glass of the present invention as a luminous body. For example, the luminescent glass of the present invention can be used as a back light of a conventional LCD, or may be used as a transparent arrangement provided in front of a display screen of a conventional display device.

Embodiments of lighting systems comprising the luminescent glass of the present invention are described below, with reference to drawings.

FIG. 1 is a diagram schematically showing an embodiment of a lighting system comprising the luminescent glass of the present invention. The lighting system 1 shown in FIG. 1 comprises a base material 2, a luminescent glass 3 provided on the base material 2, and a UV light source 4 provided on the base material 2 or placed at a position separate from the base material 2.

The base material 2 is not limited in type as long as it does not inhibit the luminescence of the luminescent glass 3, and may be, for example, a metal, glass, fence, rock, wood, concrete, plastic or other known base materials. The luminescent glass 3 functions as a lighting member (luminous body), and may be the luminescent glass of the present invention as such, or may further comprise a substrate (e.g., glass, metal, rock or the like) connected to the luminescent glass of the present invention.

The UV light source 4 may be, for example, a black light or the like. The UV light source 4 may be provided at any position as long as it can irradiate the luminescent glass with UV light. For example, the UV light source 4 may be disposed on the base 2, or may irradiate the luminescent glass 3 with UV light from a position separate from the base 2.

The means for providing the luminescent glass 3 and the black light 4 on the base 2 are not limited, and the luminescent glass 3 and the black light 4 may be physically fixed with fasteners or the like, bonded with an adhesive, or connected or adhered by known physical or chemical methods.

With such a configuration, the lighting system 1 can be used stably for a long time even outdoors, for example, in the daytime as a transparent glass that does not impair the appearance of environment, and at night as a lighting system utilizing the black light 4. The lighting system 1 can be used, for example, to indicate dangerous spots at night, to add a pleasant impression to a signboard, or other purposes.

FIG. 2 is a diagram schematically showing a lighting system 10 in which the luminescent glass of the present invention is disposed in water.

The lighting system 10 shown in FIG. 2 comprises a luminescent glass 13 placed in water and a UV light source 14 provided outside the water. The luminescent glass 13 may be the luminescent glass of the present invention as such, or may further comprise a substrate (e.g., glass, metal, rock or the like) connected to the luminescent glass of the present invention. The UV light source 14 may be, for example, a UV lamp or the like. The distance between the UV light source 14 and the luminescent glass 13 can be suitably determined according to the irradiation intensity of the UV light source 14 and other factors, as long as the UV light emitted from the UV light source 14 can make luminescent glass 13 emit luminescence.

In the lighting system 10, the UV light sources 14, such as a UV lamp, is used to radiate UV light from outside the water toward the luminescent glass 13, to thereby make the luminescent glass 13 emit luminescence in water. Unlike known underwater lightening systems, the lighting system 10 does not require electric power supply and therefore has no danger of short circuiting. Further, since the lightening system 10 consists of a small number of components, it has a good aesthetic appearance.

FIG. 3 is a diagram schematically showing a lightening system 20, which is another embodiment of a lightening system comprising the luminescent glass of the present invention placed in water. The lighting system 20 of FIG. 3 comprises a luminescent glass 23 placed in water, a UV light source 24 placed outside the water, and an optical fiber 25 disposed so that one end of the optical fiber is connected to the UV light source 24 and the other end is located in the vicinity of the luminescent glass 23.

In this lighting system, the luminescent glass 23 may be the luminescent glass of the present invention as such, or may further comprise a substrate (e.g., glass, metal, rock or the like) connected to the luminescent glass of the present invention. The UV light source 24 may be, for example, a UV lamp or the like. The optical fiber 25 is not limited as long as it can transmit the UV light emitted from the UV light source 24 to the vicinity of the luminescent glass 23. The provision of the optical fiber 25 makes it possible for the UV light emitted from the UV light source 24 to pass through the optical fiber 25 and irradiate the luminescent glass 23 from the vicinity thereof. The end of the optical fiber 25 may be disposed at a position separate from the luminescent glass 23, or may be directly attached to the luminescent glass 23 to form an integrated structure of the optical fiber 25 and the luminescent glass 23.

In the lighting system with such a configuration, the optical fiber can be installed in water because of no need of electric power supply (energization), thereby making it possible to achieve a high luminescence intensity by radiation of UV light from the vicinity of the luminescent glass 23. Further, since only the luminescent glass 23 and the optical fiber 25 need to be disposed in water to achieve the function of the lighting system, the lighting system does not require a large number of components and can be used as an underwater lightening system with excellent aesthetic appearance. Further, the lighting system does not require electric power supply, and thus has no danger of short circuits.

Although the lighting system 20 is usable as such in water, it may be treated for waterproofing.

The configuration of the lighting system is not limited to the above, and may be suitably modified according to the configurations, arrangements, designs or the like of known lighting systems.

BEST MODE FOR CARRYING OUT THE INVENTION

The following Examples illustrate the present invention in further detail.

Example 1

$Na_2CO_3$, $H_3BO_3$, $SiO_2$ and $Al(OH)_3$ were added to commercially available ground waste glass (green color glass), to prepare a mixture consisting of 35.0 wt. % of the waste glass, 3.1 wt. % of $Na_2O$, 26.2 wt. % of $SiO_2$ and 2.4 wt. % of $Al_2O_3$. The mixture was melted in the air at 1400° C. and cooled, to obtain a disc-shaped alkali borosilicate glass with a diameter of about 10 cm and a thickness of a little less than 2 mm. The obtained glass comprised 8.4 wt. % of $Na_2O$, 3.9 wt. % of CaO, 2.8 wt. % of $Al_2O_3$, 51.6 wt. % of $SiO_2$ and 33.3 wt. % of $B_2O_3$, as calculated from the raw material proportions, and further contained about 0.05 parts by weight of $Cr_2O_3$ per 100 parts by weight of the total of the above components.

The obtained alkali borosilicate glass was then heat-treated in the air at 600° C. for 40 hours to cause phase separation of the glass.

Subsequently, an about 1.2 cm square was cut from the phase-separated glass, polished and acid-treated by immersing it in 1 N nitric acid solution at 90° C. for 16 hours, to thereby obtain a porous glass.

The porous glass comprised 97.0 wt. % of $SiO_2$, 0.8 wt. % of $Al_2O_3$ and 2.1 wt. % of $B_2O_3$, and further contained as impurities 0.06 wt. % of $Na_2O$ and 0.04 wt. % of CaO. The glass had a porosity of 37%, and was colorless and transparent without absorbing or scattering light in the visible region.

About 0.3 g of the porous glass was placed in a solution of 0.2 g of $CuCl_2.2H_2O$ in 25 ml of distilled water, allowed to stand at room temperature for 1 hour, taken out from the solution, and dried at room temperature.

The glass was then slowly heated at a rate of 2° C./min, and heated at 1100° C. for 2 hours in an alumina crucible containing carbon, to thereby obtain a transparent glass.

The obtained glass comprised 97.0 wt. % of $SiO_2$, 0.8 wt. % of $Al_2O_3$, 2.1 wt. % of $B_2O_3$, 0.06 wt. % of $Na_2O$, and 0.04 wt. % of CaO, and further contained 610 ppm of Cu and about 60 ppm of Fe.

Figure 1:
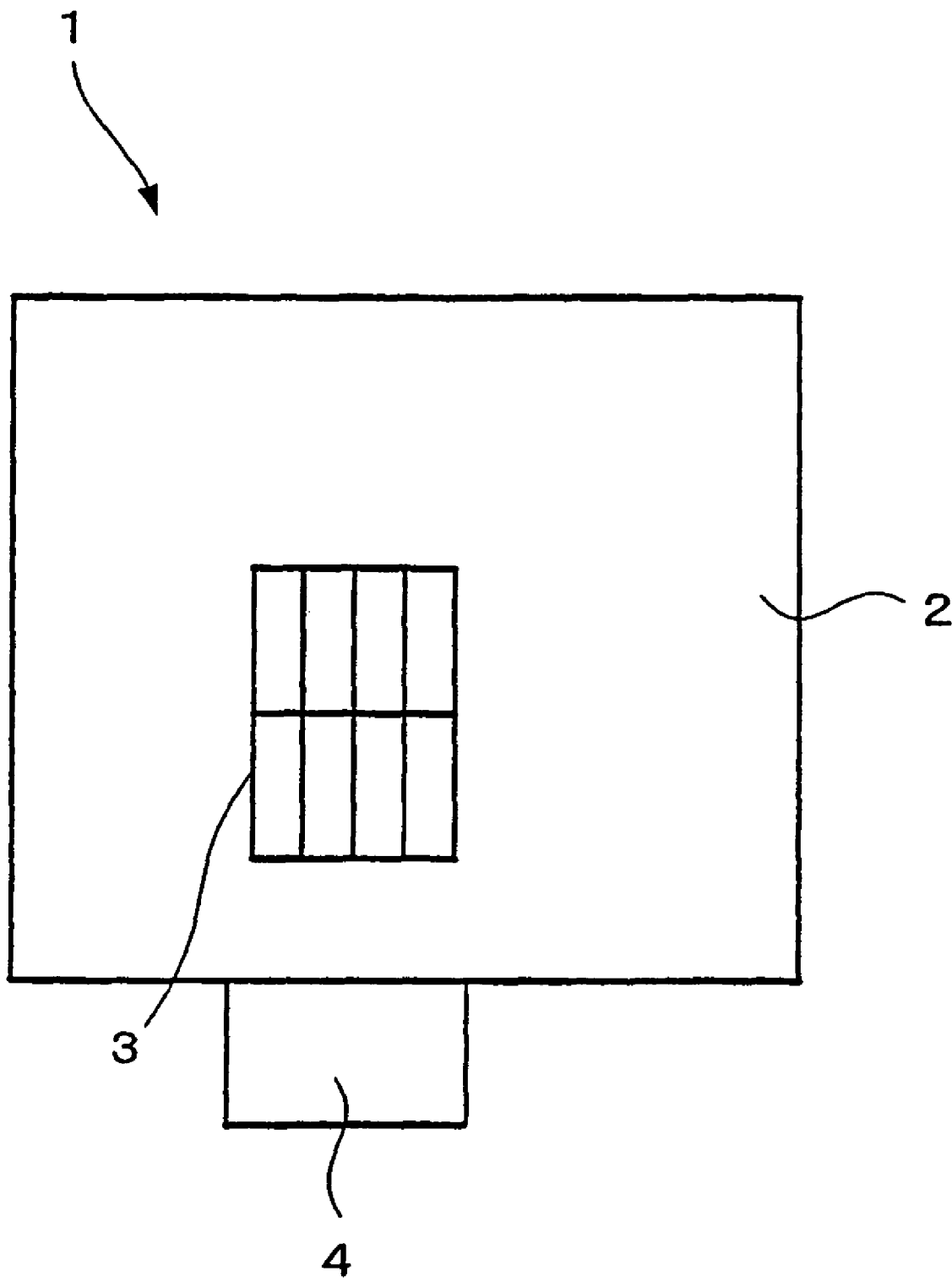
FIG. 1 is a diagram schematically showing an embodiment of a lighting system comprising the luminescent glass of the present invention.
Figure 2:
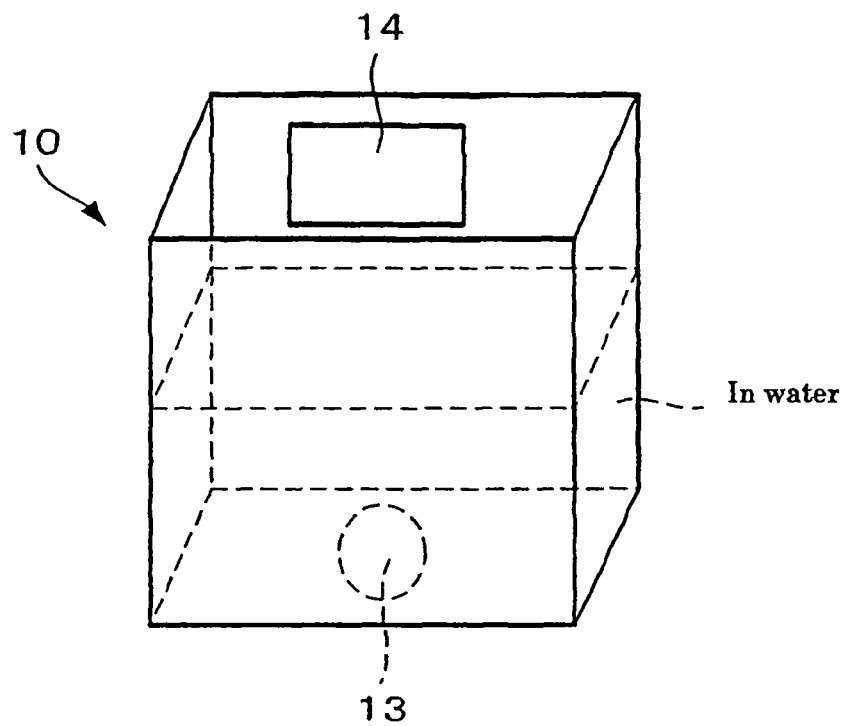
FIG. 2 is a diagram schematically showing a lighting system comprising the luminescent glass of the present invention disposed in water.
Figure 3:
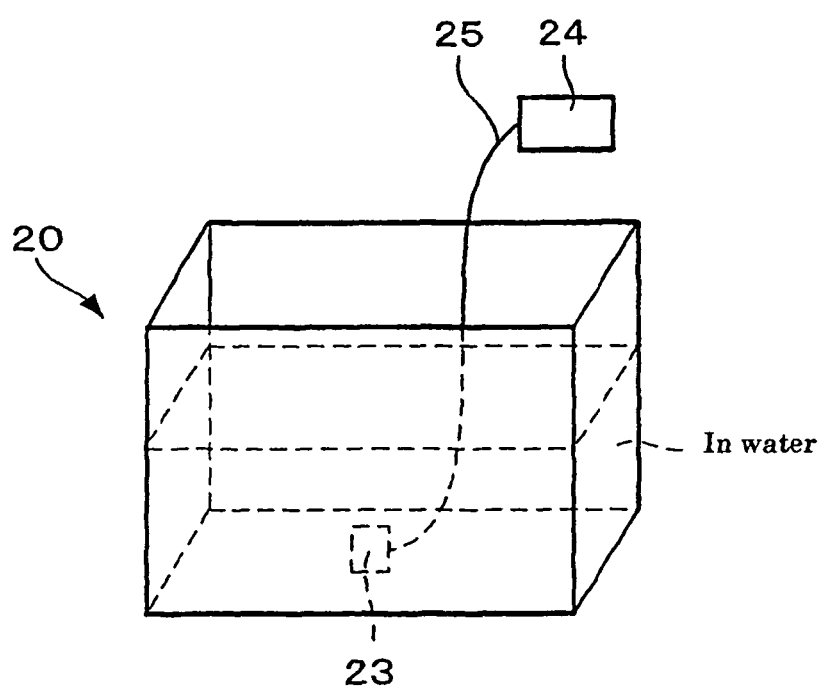
FIG. 3 is a diagram schematically showing another embodiment of a lighting system comprising the luminescent glass of the present invention disposed in water.
Figure 4:
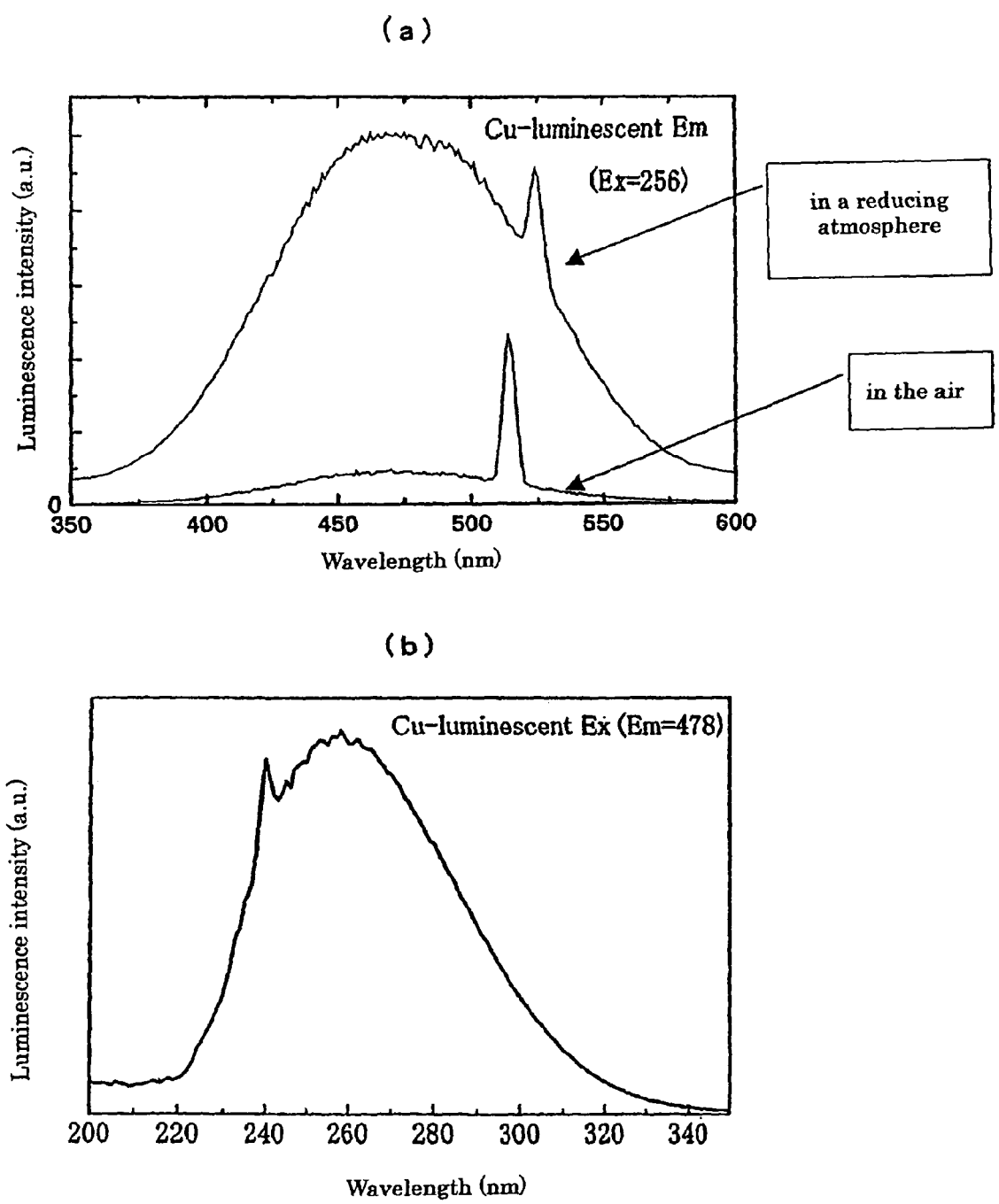
FIG. 4(a) is a graph showing the emission spectrum of the luminescent glass of Example 1.
FIG. 4(b) is a graph showing the excitation wavelength dependence of the luminescence intensity of the luminescent glass of Example 1.

This glass was irradiated with UV light at a wavelength of 256 nm to obtain an emission spectrum. FIG. 4(a) shows the obtained emission spectrum.

For comparison, another sample of the porous glass was placed in an aqueous solution of $CuCl_2.2H_2O$ and dried in the same manner as above, and heated in the air at 1100° C. for 1 hour. The obtained glass was irradiated with UV light at a wavelength of 256 nm to obtain an emission spectrum. FIG. 4(a) also shows this emission spectrum.

FIG. 4(a) reveals that the glass obtained by heating in a reducing atmosphere a porous glass to which Cu is adsorbed emits strong fluorescence in the region of 450 nm to 500 nm when irradiated with UV light at 256 nm, but the glass obtained by heating the porous glass in the air shows only extremely weak fluorescence.

FIG. 4(b) is a graph showing the excitation wavelength dependence of the luminescence intensity of fluorescence at a wavelength of 478 nm, with respect to the glass obtained by heating in a reducing atmosphere. As shown in this figure, the glass in which Cu is adsorbed is excited by irradiation with UV light in the wavelength region of about 230 nm to about 280 nm, and thereby exhibits strong luminescence.

Further, the luminescent glass was irradiated with UV light from a distance of 2 cm, using a commercially available 6 W (watt) sterilization UV lamp (wavelength: 250 nm). As a result, remarkable luminescence was observed with the naked eye.

Example 2

0.3 g of an acid-treated porous glass obtained in the same manner as in Example 1 was placed in a solution of 0.2 g of $SnCl_2.2H_2O$ in 25 ml of distilled water, allowed to stand at room temperature for 1 hour, taken out from the solution, and dried at room temperature.

The glass was then slowly heated at a rate of 2° C./min, and heated at 1100° C. for 2 hours in an alumina crucible containing carbon, to give a transparent glass.

Figure 5:
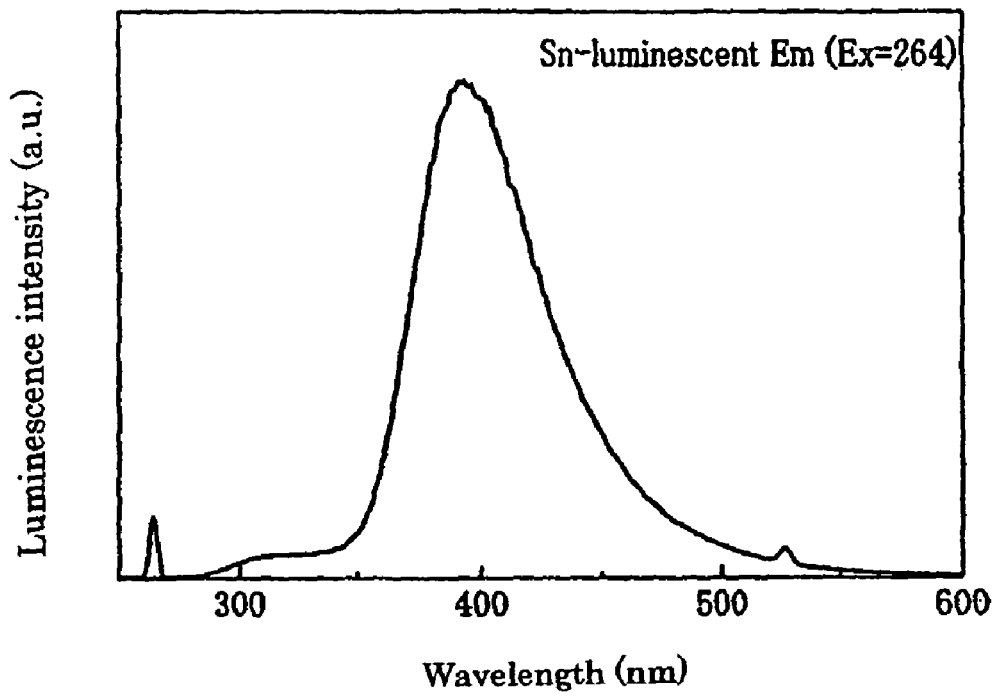
FIG. 5(a) is a graph showing the emission spectrum of the luminescent glass of Example 2.
FIG. 5(b) is a graph showing the excitation wavelength dependence of the luminescence intensity of the luminescent glass of Example 2.
Figure 5:
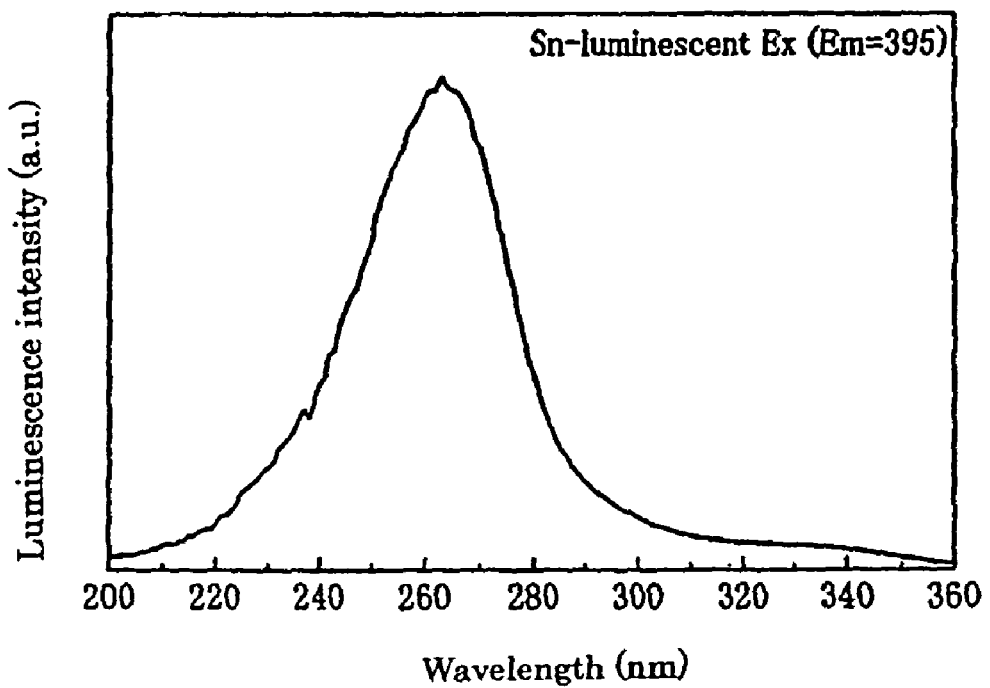

The glass was irradiated with UV light at a wavelength of 264 nm to obtain an emission spectrum. FIG. 5(a) shows the obtained emission spectrum. This figure reveals that the glass to which Sn was adsorbed, obtained by the above process, exhibit strong fluorescence around 400 nm when irradiated with UV light at 264 nm.

With respect to the fluorescence at a wavelength of 395 nm of the glass, the excitation spectrum was obtained. FIG. 5(b) shows the results. As shown in this figure, the glass to which Sn is adsorbed is excited by irradiation with UV light at a wavelength of about 250 nm to about 270 nm, and thereby shows strong luminescence.

Example 3

0.3 g of an acid-treated porous glass obtained in the same manner as in Example 1 was placed in a solution of 2.6 g of $Mn(NO_3)_2$ in 25 ml of distilled water, allowed to stand at room temperature for 1 hour, taken out from the solution, and dried at room temperature.

The glass was then slowly heated at a rate of 2° C./min, and heated at 1100° C. for 2 hours in an alumina crucible containing carbon, to give a transparent glass.

Figure 6:
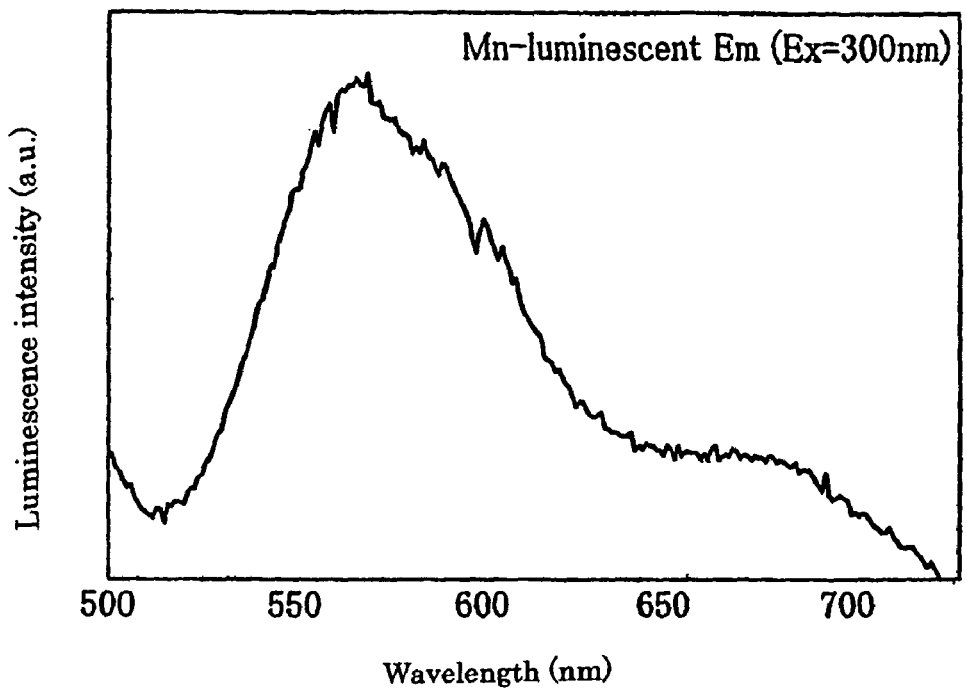
FIG. 6(a) is a graph showing the emission spectrum of the luminescent glass of Example 3.
FIG. 6(b) is a graph showing the excitation wavelength dependence of the luminescence intensity of the luminescent glass of Example 3.
Figure 6:
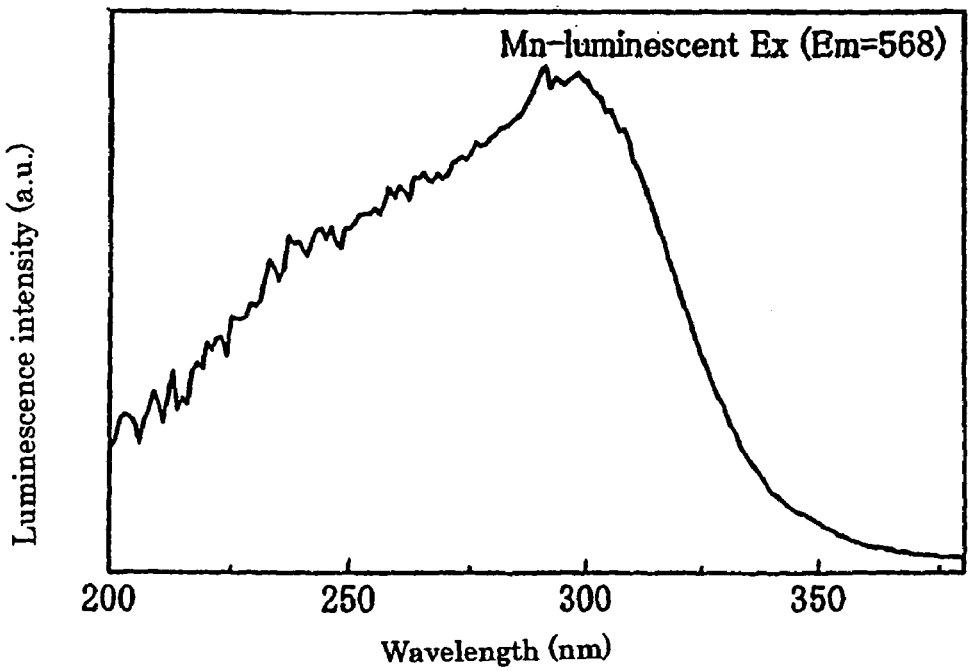

The glass was irradiated with UV light at a wavelength of 300 nm to obtain an emission spectrum. FIG. 6(a) shows the obtained emission spectrum. This figure reveals that the glass to which Mn is adsorbed, obtained by the above process, exhibits strong fluorescence in the region of 550 nm to 600 nm when irradiated with UV light at 300 nm.

FIG. 6(b) is a graph showing the excitation wavelength dependence of the luminescence intensity of fluorescence at 568 nm, of the glass. This figure reveals that the glass to which Mn is adsorbed is excited by irradiation with UV light in the wavelength region of about 200 nm to about 320 nm, and thereby exhibits strong luminescence with a jagged line.

Example 4

0.3 g of an acid-treated porous glass obtained in the same manner as in Example 1 was placed in a solution of 0.7 g of $V(NO_3)_2$ in 25 ml of distilled water, allowed to stand at room temperature for 1 hour, taken out from the solution, and dried at room temperature.

The glass was then slowly heated at a rate of 2° C./min, and heated at 1100° C. for 2 hours in an alumina crucible containing carbon, to give a transparent glass.

Figure 7:
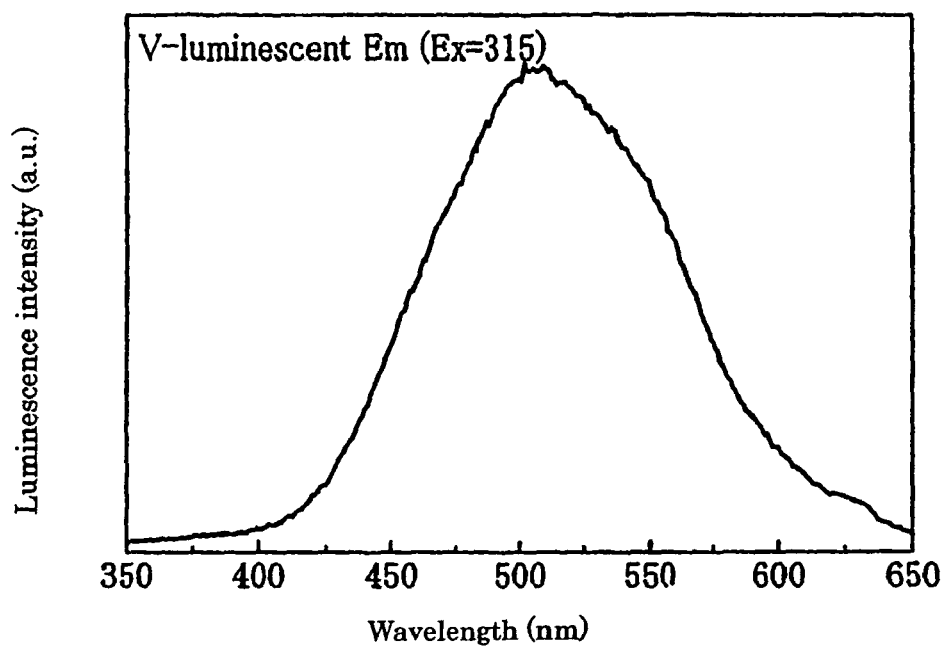
FIG. 7(a) is a graph showing the emission spectrum of the luminescent glass of Example 4.
FIG. 7(b) is a graph showing the excitation wavelength dependence of the luminescence intensity of the luminescent glass of Example 4.
Figure 7:
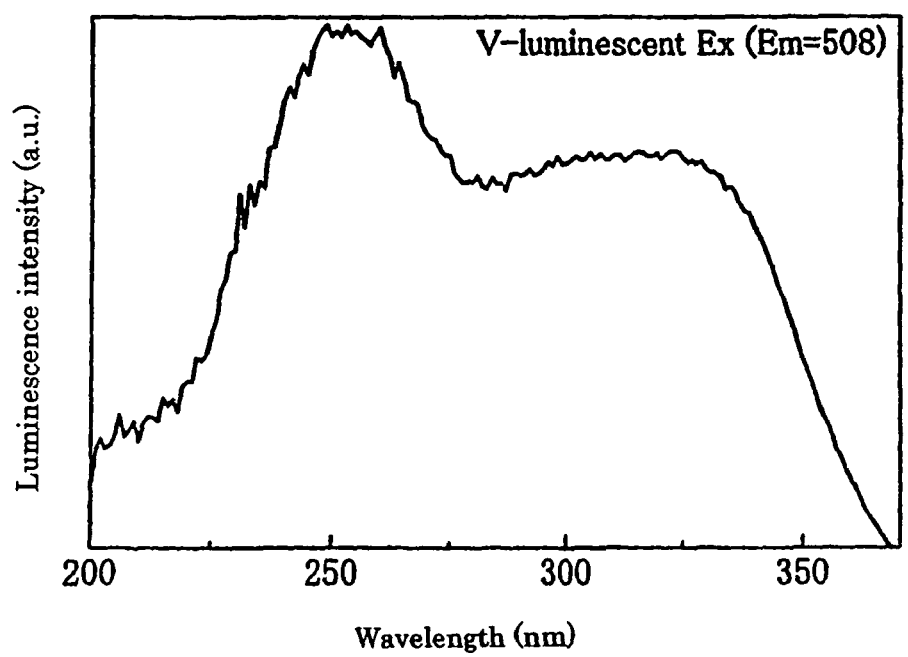

The glass was irradiated with UV light at a wavelength of 315 nm to obtain an emission spectrum. FIG. 7(a) shows the obtained emission spectrum. This figure reveals that the glass to which V is adsorbed, obtained by the above process, exhibits strong fluorescence in the range of 470 to 530 nm when irradiated with UV light at 315 nm.

With respect to the fluorescence of the glass at a wavelength of 508 nm, the excitation spectrum was obtained. FIG. 7(b) shows the results. This figure reveals that the glass to which V is adsorbed is excited by irradiation with UV light in the wavelength region of about 240 nm to about 320 nm, and thereby exhibits strong luminescence with a jagged line.

Further, glasses to each of which Ag, Co or Cr was adsorbed were prepared and irradiated with UV light. As a result, it was confirmed that these glasses exhibit strong luminescence.

Furthermore, after adsorbing luminescent components to porous glasses in the same manner as in Examples 1 to 4, 0.3 g of each of the porous glasses was separately immersed in 25 ml of a 1 N aqueous nitric acid solution containing 15 g of $Al(NO_3)_3$ dissolved therein, at room temperature for 1 hour, to thereby impregnate the porous glasses with $Al(NO_3)_3$. The glasses were then dried, slowly heated at a rate of 2° C./min, and heated at 1100° C. for 2 hours in an alumina crucible containing carbon, to give transparent glasses. When the obtained glasses were irradiated with UV light, they exhibited stronger luminescence than those obtained in Examples 1 to 4. In these glasses, it is presumed that $Al(NO_3)_3$ was decomposed by heating and converted to $Al_2O_3$.

Example 5

The Cu-doped luminescent glass obtained in Example 1 was tested for luminescence performance in the air by the following method.

The luminescent glass was heated with a burner, and irradiated with UV light (wavelength: 254 nm) from a 4 W black light.

When the glass was observed in a dark environment, it exhibited luminescence that was sufficiently bright to be visible with the naked eye.

This result confirmed that the glass obtained in Example 1 is capable of exhibiting luminescence even in a heated state, and has both excellent heat resistance and excellent luminescent properties.

Thus, it was demonstrated that the use of this glass makes it possible to produce a lighting system that has excellent heat resistance and shows a high luminescence intensity.

Example 6

0.3 g of an acid-treated porous glass obtained in the same manner as in Example 1 was placed in a solution of 0.5 g of $Eu(NO_3)_3.xH_2O$ in 10 ml of distilled water, allowed to stand at room temperature for 2 hour, taken out from the solution, and dried at 350° C. for 1 hour to decompose the nitrate. Subsequently, the porous glass was again placed in a solution of 0.5 g of $Eu(NO_3)_3 \cdot xH_2O$ in 10 ml of distilled water, allowed to stand at room temperature for 1 hour, taken out from the solution, and dried at room temperature.

The glass was then slowly heated at a rate of 2° C./min, and heated at 1100° C. for 2 hours in an alumina crucible containing carbon, to thereby obtain a transparent glass.

The obtained glass comprised 97.0 wt. % of $SiO_2$, 0.8 wt. % of $Al_2O_3$, 2.1 wt. % of $B_2O_3$, 0.06 wt. % of $Na_2O$ and 0.04 wt. % of CaO, and further contained 500 ppm of Eu and about 60 ppm of Fe.

Figure 8:
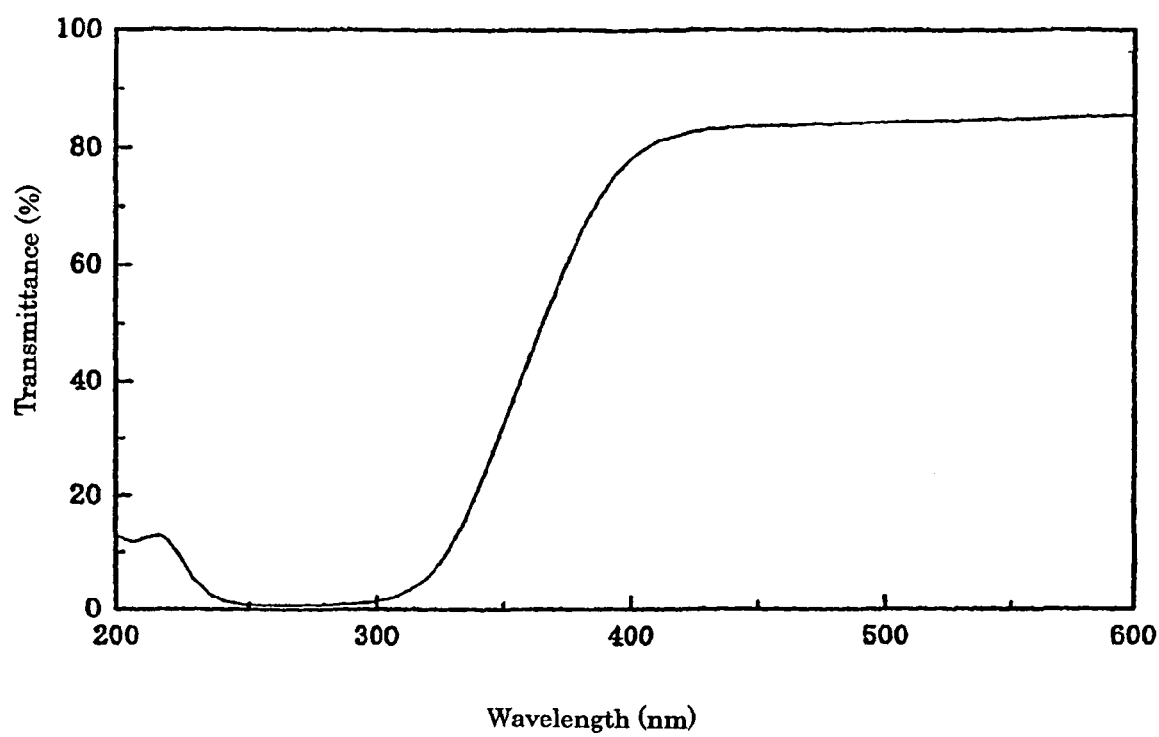
FIG. 8 is a graph showing the transmittance spectrum of the glass of Example 6.

FIG. 8 shows the transmittance spectrum of the glass. As shown in FIG. 8, the obtained glass had a high transmittance at a wavelength of about 300 nm or longer, and a transmittance of 80% or higher at wavelengths longer than 400 nm.

Figure 9:
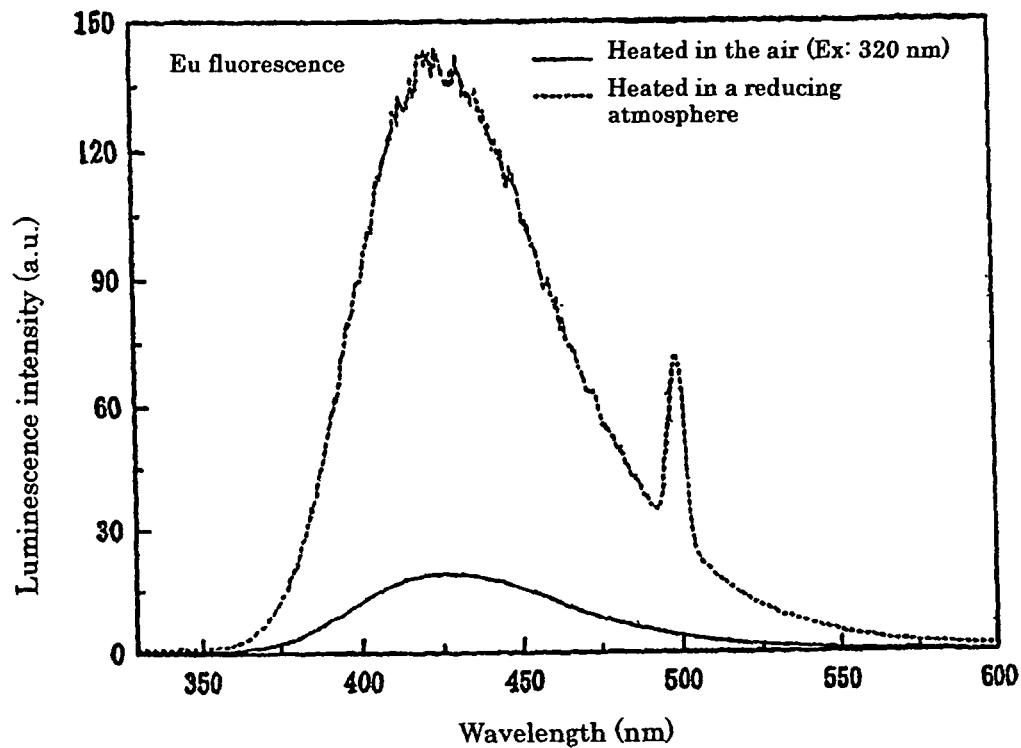
FIG. 9 is a graph showing the emission spectrum of luminescent glasses, obtained in Example 6.

This glass was irradiated with UV light at a wavelength of 254 nm to obtain an emission spectrum. FIG. 9 shows the obtained emission spectrum. For comparison, a glass was obtained in the same manner as above except that the heating was carried out in the air, and the emission spectrum thereof was obtained. In FIG. 9, the solid line indicates the fluorescence spectrum generated from the luminescent glass obtained by heating in the air, and the broken line indicates the fluorescence spectrum generated from the luminescent glass obtained by heating in a reducing atmosphere. As shown in FIG. 9, the luminescent glass obtained by heating in a reducing atmosphere emitted strong blue fluorescence at a wavelength around 430 nm. In contrast, the luminescent glass obtained by heating in the air did not exhibit strong luminescence.

Figure 10:
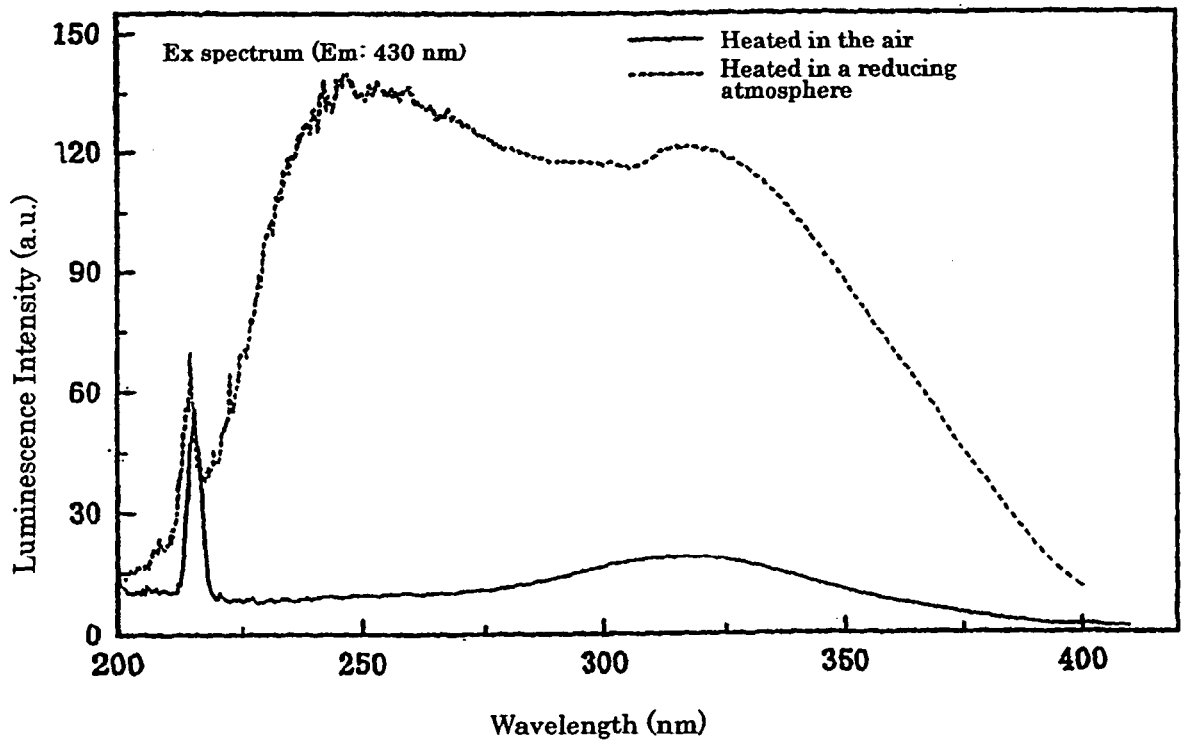
FIG. 10 is a graph showing the excitation wavelength dependence of the luminescence intensity of glasses, obtained in Example 6.

FIG. 10 is a graph showing the excitation wavelength dependence of the luminescence intensity of blue fluorescence at a wavelength of 430 nm, of the above glasses. In FIG. 10, the solid line indicates the fluorescence spectrum generated from the luminescent glass obtained by heating in the air, and the broken line indicates the fluorescence spectrum generated from the luminescent glass obtained by heating in a reducing atmosphere. FIG. 10 reveals that luminescent glass obtained by heating in a reducing atmosphere is excited by irradiation with UV light in the wavelength region of about 230 nm to about 350 nm, and thereby exhibits strong luminescence.

Further, the luminescent glass obtained by heating in a reducing atmosphere was irradiated with UV light (wavelength: 250 nm) from a distance of 2 cm, using a commercially available 6 W (watt) sterilization UV lamp. As a result, remarkable blue luminescence was observed with the naked eye.

The glass obtained by heating in an oxidizing atmosphere at 1100° C. exhibited only extremely weak red luminescence and did not show strong blue luminescence as above, since Eu was oxidized to trivalent Eu.

Example 7

$Na_2CO_3$, $H_3BO_3$, $SiO_2$ and $Al(OH)_3$ were added to a commercially available ground waste glass (green color glass), to prepare a mixture consisting of 35.0 wt. % of the waste glass, 3.1 wt. % of $Na_2O$, 33.3 wt. % of $B_2O_3$, 26.2 wt. % of $SiO_2$ and 2.4 wt. % of $Al_2O_3$. The mixture was melted in the air at 1400° C. and cooled to obtain a disc-shaped alkali borosilicate glass with a diameter of about 10 cm and a thickness of a little less than 2 mm. The obtained glass comprised 8.4 wt. % of $Na_2O$, 3.9 wt. % of CaO, 2.8 wt. % of $Al_2O_3$, 51.6 wt. % of $SiO_2$ and 33.3 wt. % of $B_2O_3$, as calculated from the raw material proportions, and further contained about 0.05 parts by weight of $Cr_2O_3$ per 100 parts by weight of the total of the above components.

The obtained alkali borosilicate glass was then heat-treated in the air at 600° C. for 40 hours to cause phase separation of the glass.

A 1.2 cm square was cut from the phase-separated glass, polished and acid-treated by immersing it in 1 N nitric acid solution at 90° C. for 24 hours, to thereby obtain a porous glass.

The obtained porous glass comprised 97.0 wt. % of $SiO_2$, 0.8 wt. % of $Al_2O_3$ and 2.1 wt. % of $B_2O_3$, and further contained as impurities 0.06 wt. % of $Na_2O$ and 0.04 wt. % of CaO. The glass had a porosity of 37%, and was colorless and transparent.

0.3 g of this porous silica glass was placed in a solution of 0.5 g of $Ce(NO_3)_3 \cdot 9H_2O$ in 10 ml of distilled water, allowed to stand at room temperature for 1 hour, taken out from the solution, and dried at 350° C. for 1 hour to decompose the nitrate. Subsequently, the porous glass was again placed in a solution of 0.5 g of $Ce(NO_3)_3 \cdot 9H_2O$ in 10 ml of distilled water, allowed to stand at room temperature for 1 hour, taken out from the solution, and dried at room temperature.

The glass was then slowly heated at a rate of 2° C./min, and heated at 1100° C. for 2 hours in an alumina crucible containing carbon, to thereby obtain a transparent glass.

For comparison, a transparent glass containing Ce as a luminescent component was obtained in the same manner as above except that the heating was carried out in the air.

Separately, a porous glass that had been immersed twice in the aqueous solution containing $Ce(NO_3)_3 \cdot 9H_2O$ and dried in the same manner as above, was further immersed in 20 ml of a 0.5 N aqueous nitric acid solution containing 15 g of $Al(NO_3)_3$ dissolved therein, at room temperature for 1 hour, to thereby impregnate the porous glass with $Al(NO_3)_3$. The glass was then dried by slowly heating from room temperature to 350° C., further heated at a rate of 2° C./min, heated at 1100° C. for 2 hours in an alumina crucible containing carbon, to give a transparent glass. It is presumed that, in this glass, $Al(NO_3)_3$ was decomposed by heating and adhered as $Al_2O_3$.

Figure 11:
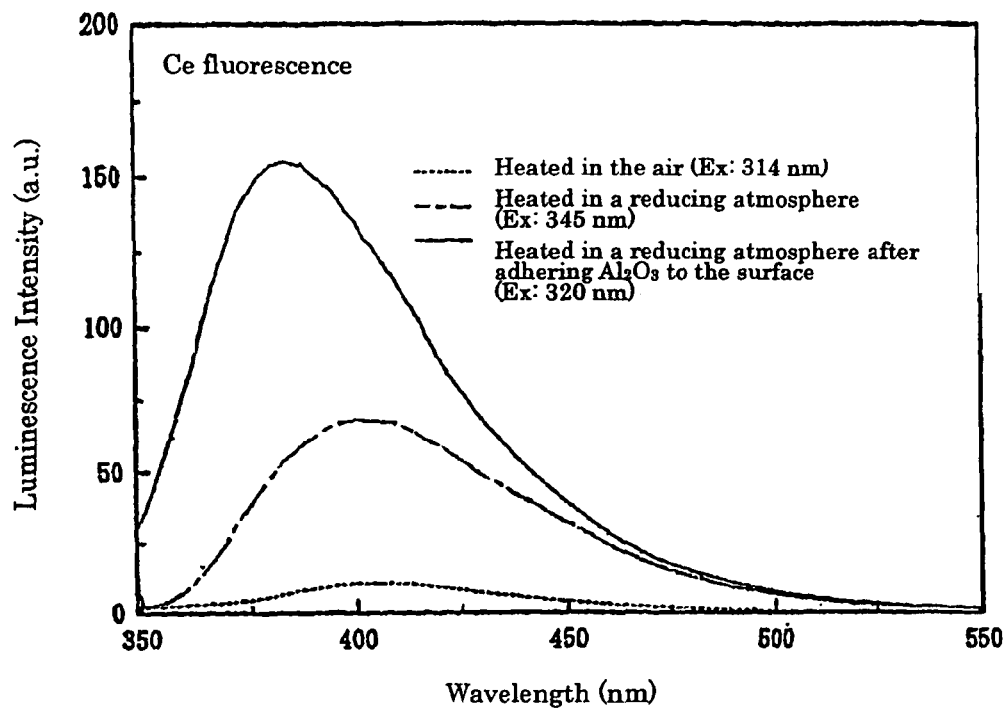
FIG. 11 is a graph showing the emission spectrum of luminescent glasses, obtained in Example 7.

The above three kinds of glasses were irradiated with UV light in the wavelength region of 310 nm to 345 nm, to obtain an emission spectrum. FIG. 11 shows the results. In FIG. 11, the broken line indicates the fluorescence spectrum generated from the luminescent glass obtained by heating in the air; the alternate long and short dash line indicates the fluorescence spectrum generated from the luminescent glass obtained by heating in a reducing atmosphere; and the solid line indicates the fluorescence spectrum generated from the luminescent glass obtained by impregnating the porous glass with $Al(NO_3)_3$ and then heating the glass in a reducing atmosphere.

FIG. 11 reveals that the luminescent glass obtained by heating in a reducing atmosphere exhibits strong fluorescence at a wavelength around 400 nm. It is also revealed that the luminescent glass to which $Al_2O_3$ adheres exhibits strong fluorescence at a wavelength around 390 nm. In contrast, the luminescent glass obtained by heating in the air did not exhibit such strong luminescence.

Figure 12:
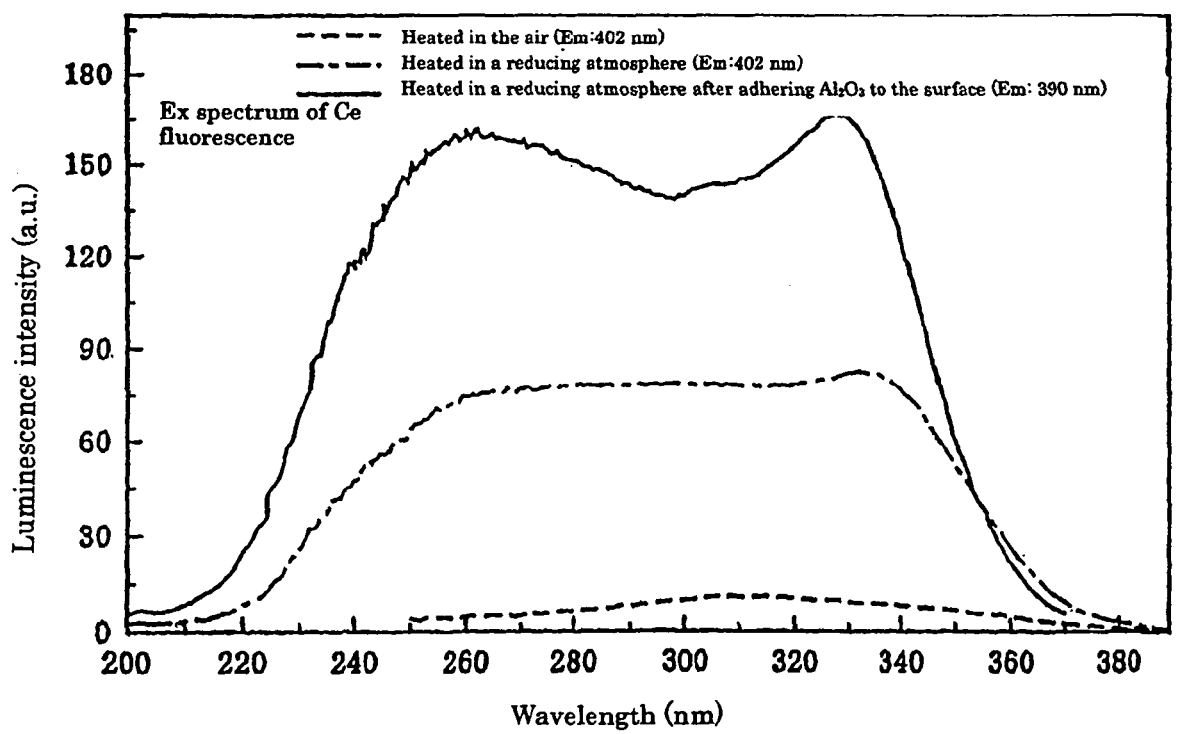
FIG. 12 is a graph showing the excitation wavelength dependence of the luminescence intensity of various kinds of glasses, measured in Example 7.

FIG. 12 is a graph showing the excitation wavelength dependence of the luminescence intensity of fluorescence at a wavelength of 380 nm, of the above three kinds of glasses. In FIG. 12, the broken line indicates the fluorescence spectrum generated from the luminescent glass obtained by heating in the air; the alternate long and short dash line indicates the fluorescence spectrum generated from the luminescent glass obtained by heating in a reducing atmosphere; and the solid line indicates the fluorescence spectrum generated from the glass with $Al_2O_3$ adhered thereto.

As shown in FIG. 12, the glass obtained by heating in a reducing atmosphere and the glass with $Al_2O_3$ adhered thereto are excited by irradiation with UV light in the wavelength region of about 230 nm to about 350 nm, and thereby exhibit strong luminescence.

Example 8

The luminescent glass doped with Eu obtained in Example 6 was tested for luminescence performance in water by the following method.

The glass was first immersed in a beaker holding 500 ml of water at 100° C., and then irradiated from outside the beaker with UV light (wavelength: 365 nm) emitted from a 4 W (watt) black light.

When observed in a dark environment, the glass in the beaker exhibited bright luminescence, which was clearly visible with the naked eye from outside the beaker.

This result confirmed that the glass obtained in Example 6 is capable of exhibiting luminescence even in hot water, and has both excellent heat resistance and excellent luminescent properties.

Thus, it was demonstrated that the use of the glass makes it possible to produce an underwater lighting system that has excellent heat resistance and shows a high luminescence intensity.

Example 9

The Eu-doped luminescent glass obtained in Example 6 was tested for luminescence performance in the air by the following method.

This glass was heated with a burner and irradiated with UV light (wavelength: 365 nm) emitted from a 4 W black light.

When the glass was observed in a dark environment, it exhibited luminescence that is sufficiently bright to be visible with the naked eye.

This result demonstrates that the glass obtained in Example 6 is capable of exhibiting luminescence in a heated state, and has both excellent heat resistance and excellent luminescent properties.

Thus, it was demonstrated that the use of the glass makes it possible to produce a lighting system that has excellent heat resistance and shows a high luminescence intensity.

The invention claimed is:

1. A luminescent glass obtained by a process comprising the steps of adsorbing, to a porous high silica glass, at least one metal component selected from the group consisting of Sc, Y, La, Pr, Nd, Pm, Gd, Tb, Dy, Ho, Er, Tm, Yb, Lu, and elements of Groups IVA, VA, VIA, VIIA, VIII, IIB and IVB of the Periodic Table; and thereafter heating the porous glass in a reducing atmosphere, the luminescent glass comprising at least 96 wt. % of $SiO_2$, 0.5 to 3 wt. % of $B_2O_3$, 0.1 to 1.5 wt. % of $Al_2O_3$, and 50 to 2000 ppm of at least one metal component selected from the group consisting of Sc, Y, La, Pr, Nd, Pm, Gd, Tb, Dy, Ho, Er, Tm, Yb, Lu, and elements of Groups IVA, VA, VIA, VIIA, VIII, IIB and IVB of the Periodic Table.

2. A luminescent glass according to claim 1, wherein the metal component to be adsorbed to the porous high silica glass is at least one member selected from the group consisting of elements of the fourth period of the Periodic Table, elements of the fifth period of the Periodic Table, and lanthanoids.

3. A luminescent glass according to claim 2, wherein the metal component to be adsorbed to the porous high silica glass is at least one member selected from the group consisting of V, Cr, Mn, Fe, Co, Ni, Sn, and Tb.

4. A luminescent glass according to claim 1, wherein the metal component to be adsorbed to the porous high silica glass is at least one metal component selected from the group consisting of Sc, Y, La, Pr, Nd, Pm, Gd, Tb, Dy, Ho, Er, Tm, Yb, Lu.

5. A luminescent glass according to claim 1, wherein the metal component to be adsorbed to the porous high silica glass is at least one metal component selected from the group consisting of elements of Groups IVA, VA, WA, VIIA, VIII, IIB and IVB of the Periodic Table.

6. A luminescent glass according to claim 1, wherein the heating temperature is 900 to 1600° C.

7. A luminescent glass according to claim 1, obtained by the process which further comprises, before the heating step, the step of adsorbing, to the porous glass, at least one element selected from the group consisting of B, N, F, Al, and P.

8. A luminescent glass according to claim 1, wherein the porous high silica glass is obtained by causing phase separation of an alkali borosilicate glass by heat treatment and then treating the phase-separated glass with an acid.

* * * * *